United States Patent Office 3,154,151
Patented Oct. 27, 1964

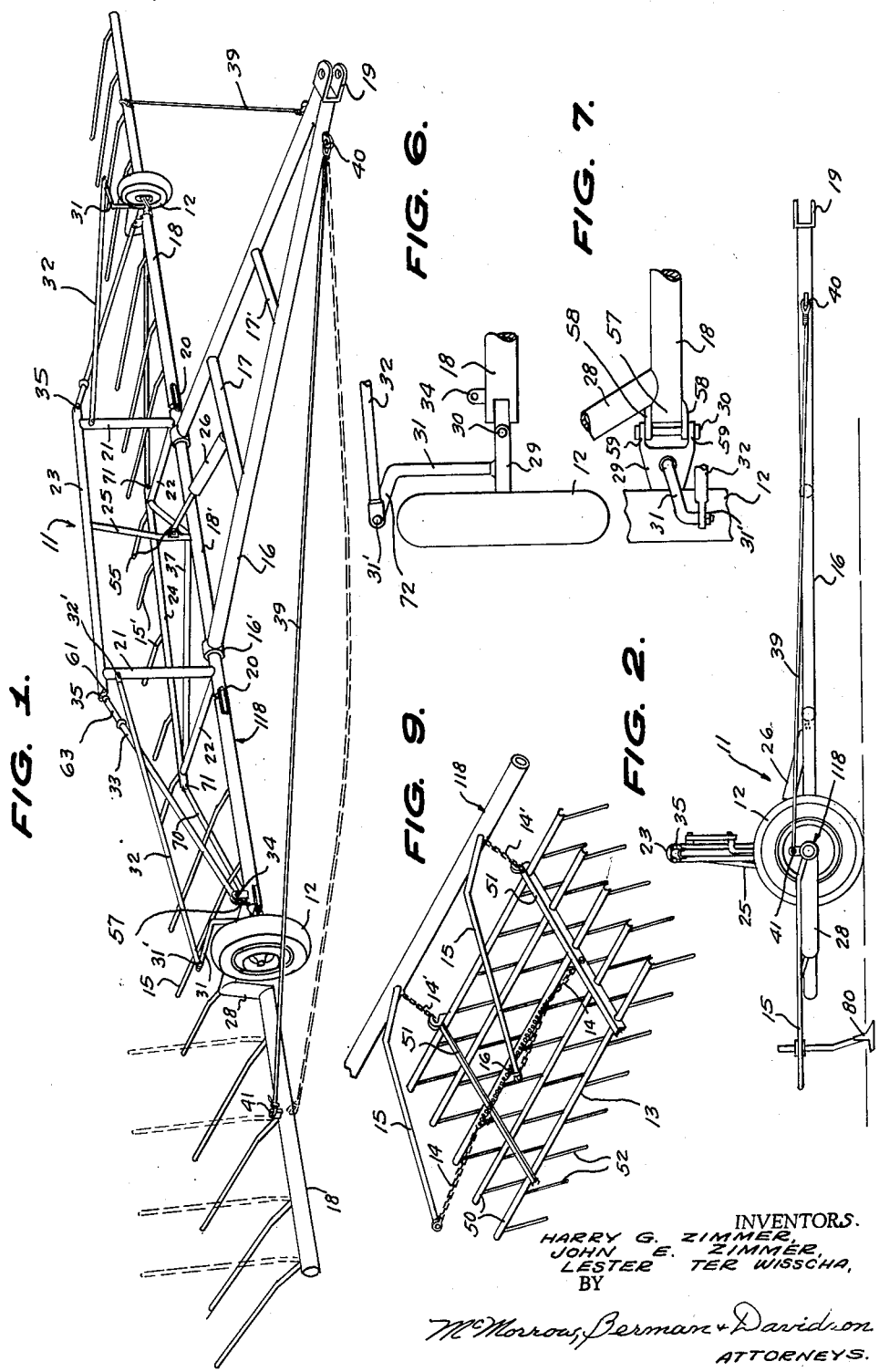

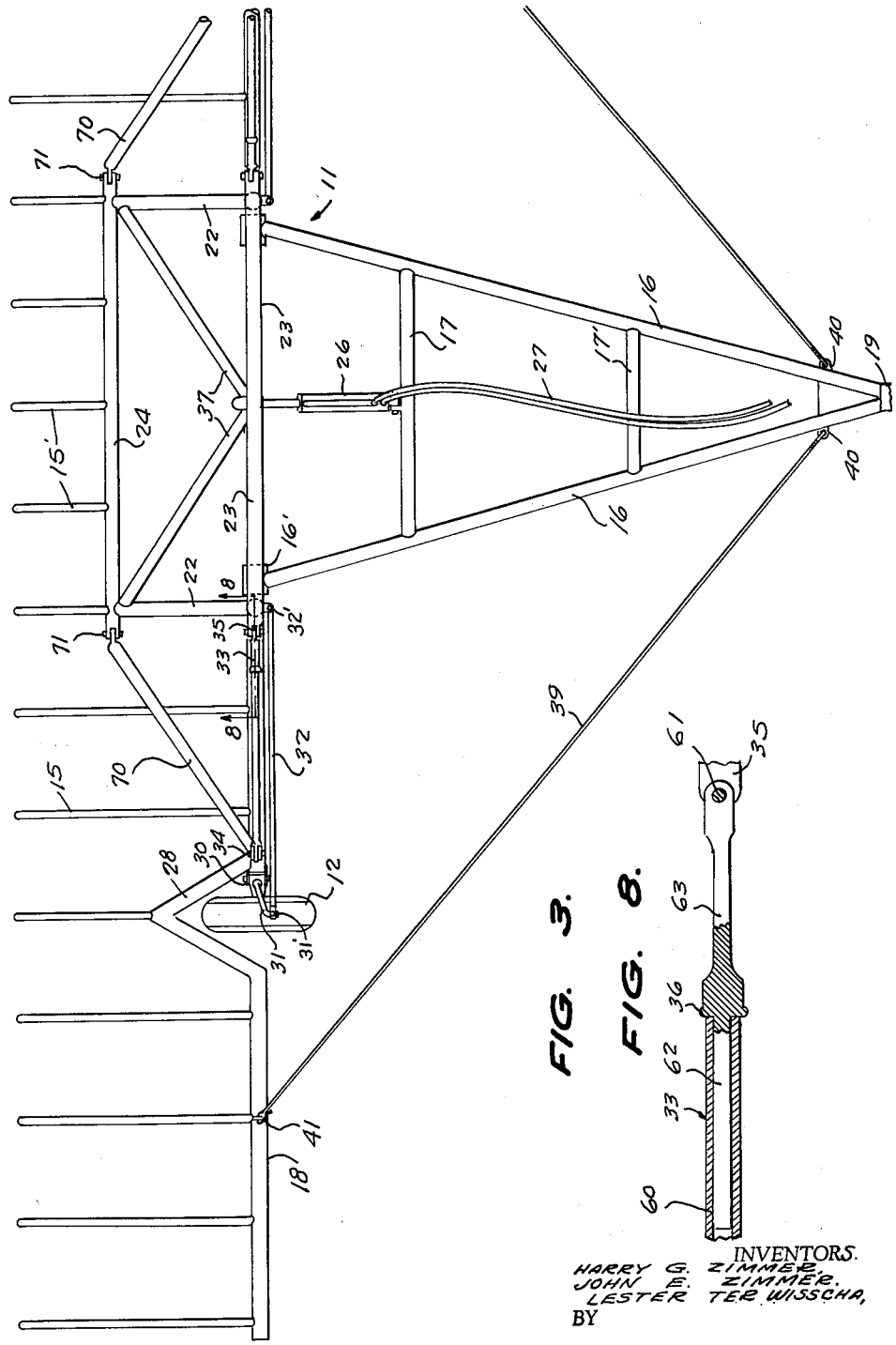

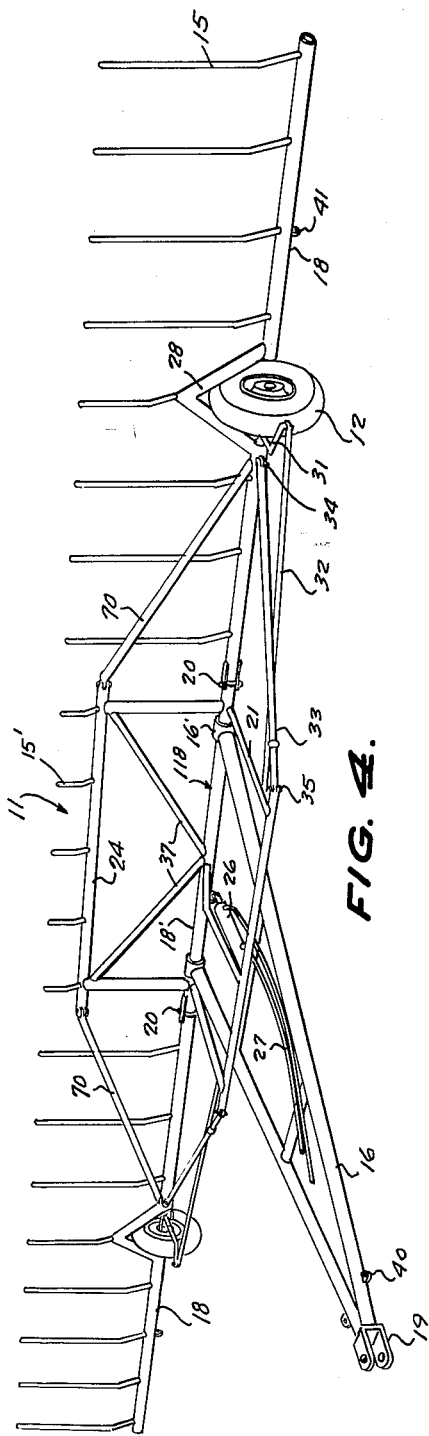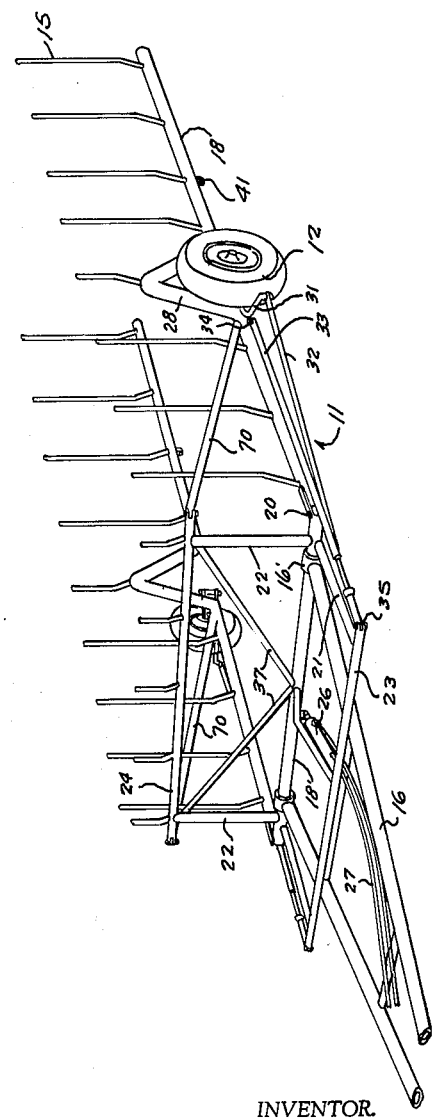

3,154,151
HYDRAULICALLY OPERATED DRAG DEVICE
Harry G. Zimmer, Raymond, and John E. Zimmer and
Lester Ter Wisscha, Clara City, Minn.
Filed Jan. 11, 1963, Ser. No. 250,828
9 Claims. (Cl. 172—456)

This invention relates to foldable mobile trailer devices, and more particularly to a foldable drag cart for carrying harrow sections, or the like.

A main object of the invention is to provide a mobile trailer device for carrying harrow sections, and similar ground-working implements, the trailer device being of simple and inexpensive construction, being readily and easily extended for use, and being foldable for transportation or storage.

A further object of the invention is to provide an improved mobile harrow drag cart which is adapted to carry a plurality of harrow sections, and is also adapted to carry the sections in confined positions for transport on a highway, or the like.

A still further object of the invention is to provide an improved mobile harrow drag cart adapted to support tillage attachments, said cart being provided with means for the driver of the associated towing vehicle to raise and lower the tillage attachments.

A still further object of the invention is to provide an improved mobile harrow drag cart adapted to support a plurality of tillage attachments, the cart being provided with means for controlling the downward force exerted by the associated tillage attachments upon the ground, thus providing a means of preventing damage to young plants subjacent the tillage attachments while the cart is being used.

A still further object of the invention is to provide an improved mobile harrow drag cart having means whereby the wheels of the cart will remain aligned during the various phases of operation of the device, for example, during the folding of the device, and during the raising and lowering of the associated tillage attachments, requiring no manual adjustment whatsoever to the wheels.

Further objects and advantages of the invention will become apparent from the following description and claims, and from the accompanying drawings, wherein:

FIGURE 1 is a perspective view of an improved mobile harrow drag cart constructed in accordance with the present invention.

FIGURE 2 is a side elevational view of the drag cart of FIGURE 1, shown with plowing attachments secured thereto and in a position ready for use.

FIGURE 3 is an enlarged top plan view of the drag cart in a position ready to receive tillage attachments.

FIGURE 4 is a perspective view of the drag cart of FIGURE 1, showing the supporting arms of the tillage bar in their elevated positions.

FIGURE 5 is a perspective view of the drag cart of FIGURE 1, showing the tillage bar in its folded position and showing the drag cart ready for transportation or storage.

FIGURE 6 is an enlarged front elevational view of one of the ground-engaging supporting wheels of the drag cart of FIGURES 1 to 5 and the elements associated therewith.

FIGURE 7 is a fragmentary top plan view of the wheel and associated elements of FIGURE 6.

FIGURE 8 is an enlarged fragmentary longitudinal cross sectional view taken substantially on the line 8—8 of FIGURE 3.

FIGURE 9 is a fragmentary perspective view showing harrow sections attached to the arms of the drag cart.

Referring to the drawings, 11 generally designates a mobile harrow drag cart constructed in accordance with the present invention. As will be presently described, the harrow drag cart is provided with means to support a plurality of harrow sections 13, shown in FIGURE 9, each harrow section being attachable to the cart by means of respective pairs of chains 14, 14 and 14', 14' depending from the outer and inner ends of pairs of adjacent supporting arms 15 which extend from the rear of the drag cart when it is in its operative position. Each harrow section 13 is held in a substantially horizontal position during operation of the drag cart.

In the arrangement illustrated in FIGURE 9, each harrow section 13 comprises a plurality of transversely extending spaced parallel supporting bars 50 which are rigidly connected in spaced parallel relationship by a pair of parallel cross bars 51, 51 which may be of right angular cross section. The transverse bars 50 may be of downwardly facing channel-shaped cross section, as shown. Rigidly secured in the downwardly facing channel bars 50 are spaced vertical depending prongs or tines 52 which are engageable with the ground to provide a furrowing action as the drag cart is pulled along its course of travel. The forward supporting chains 14' are connected between the forward end portions of the supporting arms 15 and the forward ends of the cross bars 51, and the rear supporting chains 14 are connected between the rear ends of the supporting arms 15 and the intermediate portions of the cross bars 51. The intermediate portions of the rear chains 14 are connected by horizontally extending coiled springs 16, as shown in FIGURE 9, which tend to resiliently support the harrow section 13 in a manner to reduce the downward force exerted by the weight of the harrow section, providing a cushioned suspension of the harrow section from the associated pair of supporting arms 15, 15.

As shown in FIGURE 9, the coiled spring 16 tends to draw the intermediate portions of the chains 14, 14 together, allowing a limited amount of vertical reciprocatory movement of the harrow section, and in effect, providing a resilient suspension of the harrow section from the supporting arms 15, 15.

The main framework of the harrow drag cart 11 comprises a pair of forwardly converging hitch bars 16, 16 which are rigidly connected by a pair of spaced reinforcing cross bars 17 and 17'. The hitch bars 16 are of equal lengths and join at an acute angle at the front end of the cart, being welded to a clevis 19 which is adapted to be attached to a corresponding hitch connector on the towing vehicle. The cross bars 17 and 17' are rigidly connected in any suitable manner to the hitch bars 16, 16, for example by welding.

The rear ends of the hitch bars 16 are provided with transversely aligned journal sleeves 16' which are rotatably mounted on the center section 18' of a three-part tillage bar assembly designated generally at 118. The tillage bar assembly 118 comprises the three sections 18, 18' and 18 shown in FIGURE 1, the three sections being hinged together at hinge joints 20, 20. The evenly spaced parallel supporting arms 15 are welded perpendicularly to the elements of the tillage bar assembly 118 along its length.

Rigidly secured to center section 18' of the tillage bar assembly 118 is a first framework comprising a pair of supporting posts 21, 21 located outwardly of the journal sleeves 16', 16' and extending perpendicular to the center tillage bar section 18'. The ends of the posts 21, 21 are rigidly connected by a transversely extending bar member 23 extending parallel to the tillage bar section 18'. A second framework is rigidly secured to the center tillage bar section 18' in a plane perpendicular to the plane of the above described first framework, the second frame structure comprising the parallel supporting bars 22, 22 rigidly secured to the center tillage bar section 18' and extending perpendicularly thereto. Rigidly connected to the outer ends of the supporting bars 22, 22 is a transversely extending horizontal bar member 24 which extends parallel to the tillage bar center section 18'. As shown in FIGURE 1, the frame elements 22, 22, 24 and 18' define a rectangle lying substantially in the same plane as the supporting arms 15. As shown at 15' certain of the supporting arms are shortened and are rigidly secured to the transverse frame member 24.

Similarly, the elements of the first-named frame structure, namely, the supporting posts 21, 21, the transverse bar 23 and the center tillage bar section 18' define a rectangle which lies in a plane substantially perpendicular to the plane of the supporting arms 15 and 15'.

A center frame member 25 is welded between transverse frame member 23 and the center tillage bar section 18'. A hydraulic fluid pressure cylinder 26 is pivoted to the intermediate portion of the cross bar 17 and is provided with a piston whose piston rod is pivoted at 55 to the bar 25 at a point spaced from but located adjacent to the center tillage bar section 18'. The fluid pressure cylinder 26 is provided with suitable control piping leading to the towing vehicle, which is of a type provided with a suitable fluid pressure source and with control valves therefor, whereby the operator of the towing vehicle may control the operation of the hydraulic fluid pressure cylinder 26, which may be thus employed to rotate the tillage bar assembly 118, for example, to pull the upstanding frame section containing bar 25 toward and away from the towing frame comprising hitch bars 16, 16 and cross bars 17 and 17'. For example, when the piston rod of the hydraulic cylinder 26 is retracted from the position shown in FIGURE 1, the supporting arms 15 are elevated from their rearwardly extending substantially horizontal positions to upstanding positions, such as are shown in dotted view in FIGURE 1.

Each of the side members 18, 18 of the tillage bar assembly 118 is provided with a V-shaped offset 28 formed integrally therewith which provides clearance for a respective ground-engaging supporting wheel 12, each wheel being connected to the associated tillage bar section 18 by means illustrated in detail in FIGURES 6 and 7. Each wheel 12 is journaled on an axle 29 which is hinged at 30 to a projecting arm portion 57 of the associated tillage bar section 18, the arm portions 57 projecting inwardly of the V-shaped offset 28. As shown in FIGURE 7, each arm portion 57 is provided with a pair of parallel flanges 58, 58 which are received between the parallel pivot lugs 59, 59 of the associated axle 29. The pivot pin 30 extends through the lugs 59, 59 and the flanges 58, 58 received therebetween, so that the axle 29 is pivoted to the associated arm 57 on an axis transverse to the tillage bar section 18, namely, on an axis which is vertical when the tillage bar assembly 118 has been rotated to the position thereof shown in FIGURE 4 wherein the supporting arms 15 and 15' are substantially vertical.

The pivotal axes of the hinges 20, 20 connecting the inner ends of the tillage bar sections 18 with the outer ends of the intermediate tillage bar sections 18' are likewise vertical in the position of FIGURE 4, being parallel to the hinge axes of the pins 30.

With the parts in the positions thereof shown in FIGURE 1, the center tillage bar section 18' is supported against sagging by respective strut assemblies comprising telescoping supports 33 connected between lugs 35 at the ends of the frame bars 23 and upstanding lugs 34 provided on the extensions 57 at the inner sides of the V-shaped offset 28. Each strut assembly 33 comprises an elongated sleeve 60, shown in FIGURE 8, which slidably receives a reduced shank 62 of a bar segment 63, said bar segment being provided with a stop shoulder 36 which limits the inward movement of the bar segment 63 into the sleeve member 60 and provides a compression-resisting strut assembly. The member 63 is pivotally connected to the end lugs 35 of the frame member 23 by a connecting pin 61. The telescoping struts 33 allow extension of the sleeve members 60 relative to their associated bar segments 63 when the tillage bar segments 18 are swung rearwardly to the positions shown in FIGURE 5.

The ends of the transversely extending frame bars 24 are connected to the members 18 by inclined brace bars 70, 70 and pivot connections 71, 71 which are aligned with the axes of the hinges 20, 20.

The axles 29 are supportingly connected to the post members 21 by respective link bars 32, 32 pivotally connected at 32' to the upper end portions of the post members 21, 21, as viewed in FIGURE 1, and at 31' to the top ends of respective angled arms 31, 31 rigidly secured to the axles 29, 29. In the operating position of the cart, as shown in FIGURE 1, the link bars 32, 32 act as compression members to hold the axles 29 in substantially horizontal positions under the loading imposed thereon by the weight of the assembly, the load being transferred to the link bars 32 through the rigid arms 31 which are disposed inwardly adjacent to the wheels 12 and which are formed with the outwardly extending top portions 72 extending over the wheels, in the position of FIGURE 1, and being connected at their ends at 31' to the link bars 32.

The link bars 32 also serve as means determining the positions of the wheels 12 when the cart is being folded or unfolded. Thus, the link bars 32 act as tension members when the cart is being folded to the position of FIGURE 5, causing the wheels to be moved as the cart is being folded so that the wheels remain in alignment and disposed in longitudinal vertical planes. As shown in FIGURE 4, when the tillage bar assembly 118 is rotated to a position wherein the arms 15 and 15' extend substantially vertically upwardly, the linkages defined by the members 31 and 32 are located in substantially horizontal planes. When the outer tillage bar segments 18, 18 are rotated from the position of FIGURE 4 to the rearwardly extending parallel positions of FIGURE 5, the link bars 32 cause the wheels 12 and their axles 29 to be rotated through angles of substantially 90° around the axes of their pivot pins 30. Thus, as shown in FIGURE 5, the wheels 12, 12 remain parallel and in longitudinal alignment with the direction of travel of the cart when it is pulled by its associated towing vehicle.

It will be apparent that the axes of the hinges 20, 20, 71, 71, the pivot connections at 35, 35 and 34, 34, and the hinge connections at pins 30, 30, are vertical when the supporting arms 15 and 15' are in vertical positions, and similarly are horizontal when the arms 15 and 15' are in horizontal positions. This allows the cart to be converted from the normal operating position thereof shown in FIGURE 1 to the inoperative position shown in FIGURE 4 by operation of the fluid pressure cylinder 26, as above described, and allows the outer tillage bar segments 18, 18 to be folded to their rearwardly extending parallel positions, shown in FIGURE 5. As above mentioned, the wheels 12, 12 are maintained in aligned positions extending in the longitudinal planes parallel to each other and parallel to the direction of movement of the parts by the towing vehicle.

For increased strength, diagonal frame bars 37, 37 are welded between the joints at the ends of the horizontal frame member 24 to a common center point on the intermediate tillage bar segment 18'.

Respective flexible cables 39, 39 of stranded steel wire or similar material with substantial tensile strength, are fastened between lugs 40, 40 on hitch bars 16, 16 near clevis 19 and lugs 41, 41 on tillage bar segments 18, 18 near the ends of the tillage bar segments to absorb the reactive rearward force on said tillage bar segments during operation of the cart. Lugs 41, 41 are located so that they project upwardly from tillage bar segments 18, 18 when the supporting arms 15 are in operative horizontal rearwardly extending positions, such as shown in FIGURE 1, and so that the cables 39, 39 are taut in this condition of the apparatus; however, said cables are relatively loose when the arms 15 are raised to upwardly projecting, substantially vertical positions, allowing the cables to be removed before folding the cart.

With harrow sections 13 suitably attached to arms 15 in accordance with FIGURE 9, and with the cart in the position shown in FIGURE 1, the device may be used as a harrow or ground evener when towed by a tractor or similar vehicle.

The effectiveness of coiled springs 16 in lightening the contact of the harrow sections with the ground, for example, to prevent damage to young plants, may be adjusted by attaching the springs to respective different links of the chains 14.

Tillage tools other than harrows may also be mounted on the supporting arms 15, for example, depending plow beams carrying plow shares 80, as shown in FIGURE 2.

The operator may raise or lower the tillage tools by operation of the fluid pressure cylinder 26.

When it is desired to store or transport the cart, the operator raises the arms 15 by operating the fluid pressure cylinder 26, detaches the cables 39 and folds back the side tillage bar segments 18, 18 by pulling the cart forwardly, namely, by driving the tractor or other pulling vehicle forwardly. The rear ends of the tillage bar segments 18, 18 may then be tied together with a rope, or the like. The folding operation can be performed with the tillage tools in place on the supporting arms 15. The cart may then be conveniently stored, or may be hauled along a road or highway to any desired destination.

To place the machine in operation, the reverse procedure may be followed, namely, with the bar segments 18, 18 untied the cart is backed up, causing the bar segments to spread out. The cables 39 are then attached and the arms 15 are lowered, placing the cart in condition for operation.

While a specific embodiment of an improved mobile harrow drag cart has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, means to rotate said tillage bar segments between an operating position wherein said supporting arms extend substantially horizontally and rearwardly and a non-operating position wherein said supporting arms project upwardly, respective axles pivoted to said side bar segments, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, and link means connecting said axles to said intermediate tillage bar segment and controlling the direction of said wheels so as to maintain said wheels parallel and in longitudinal alignment with the direction of travel of the cart as said side tillage bar segments are being folded rearwardly.

2. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, a fluid pressure cylinder and piston assembly operatively connected between said hitch frame and intermediate tillage bar segment to rotate the tillage bar segments between an operating position wherein said supporting arms extend substantially horizontally and rearwardly and a non-operating position wherein said supporting arms project upwardly, respective axles pivoted to said side bar segments, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, and link means connecting said axles to said intermediate tillage bar segment and controlling the direction of said wheels so as to maintain said wheels parallel and in longitudinal alignment with the direction of travel of the cart as said side tillage bar segments are being folded rearwardly.

3. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, means to rotate said tillage bar segments between an operating position wherein said supporting arms extend substantially horizontally and rearwardly and a non-operating position wherein said supporting arms project upwardly, respective axles pivoted to said side bar segments, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, respective control arms secured to said axles, and link means connecting said axles to said intermediate tillage bar segment and controlling the direction of said wheels so as to maintain said wheels parallel and in longitudinal alignment with the direction of travel of the cart as said side tillage bar segments are being folded rearwardly.

4. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, means to rotate said tillage bar segments between an operating position wherein said supporting arms extend substantially horizontally and rearwardly and a non-operating position wherein said supporting arms project upwardly, respective axles pivoted to said side bar segments, said axles being pivoted to said side bar segments on axes parallel to the axes of the hinge connections of said side bar segments to the intermediate tillage bar segment, said axes being all substantially vertical when the tillage bar segments are in said non-operating position and being horizontal when said bar segments are in said operating position, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, and link means connecting said axles to said intermediate tillage bar segment and controlling the direction of said wheels so as to maintain said wheels parallel and in longitudinal alignment with the direction of travel of the cart as said side tillage bar segments are being folded rearwardly.

5. A harrow drag cart comprising a hitch frame attachable to a towing vehicle, an intermediate transversely extending tillage bar segment journalled to said hitch frame, respective side tillage bar segments hinged to the ends of said intermediate segment, a plurality of substantially coplanar harrow supporting arms rigidly secured to said tillage bar segments, a fluid pressure cylinder and piston assembly operatively connected between said hitch frame and intermediate tillage bar segment to rotate said tillage bar segments between an operating position wherein said supporting arms extend substantially horizontally and rearwardly and a non-operating position wherein said supporting arms project upwardly, respective axles pivoted to said side bar segments, said axles being pivoted to said side bar segments on axes parallel to the axes of the hinge connections of said side bar segments to the intermediate tillage bar segment, said axes being all substantially vertical when the tillage bar segments are in said non-operating position and being horizontal when said bar segments are in said operating position, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, and link means connecting said axles to said intermediate tillage bar segment and controlling the direction of said wheels so as to maintain said wheels parallel and in longitudinal alignment with the direction of travel of the cart as said side tillage bar segments are being folded rearwardly.

6. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, means to rotate said tillage bar segments between an operating position wherein said supporting arms extend substantially horizontally and rearwardly and a non-operating position wherein said supporting arms project upwardly, respective axles pivoted to said side bar segments, said axles being pivoted to said side bar segments on axes parallel to the axes of the hinge connections of said side bar segments to the intermediate tillage bar segment, said axes being all substantially vertical when the tillage bar segments are in said non-operating position and being horizontal when said bar segments are in operating position, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, means limiting upward rotation of said side tillage bar segments relative to said intermediate tillage bar segment, and link means connecting said axles to said intermediate tillage bar segment and controlling the direction of said wheels so as to maintain said wheels parallel and in longitudinal alignment with the direction of travel of the car as said side tillage bar segments are being folded rearwardly.

7. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, means to rotate said tillage bar segments between an operating position wherein said supporting arms extend substantially horizontally and rearwardly and a non-operating position wherein said supporting arms project upwardly, respective axles pivoted to said bar segments, said axles being pivoted to said side bar segments on axes parallel to the axes of the hinge connections of said side bar segments to the intermediate tillage bar segment, said axes being all substantially vertical when the tillage bar segments are in said non-operating position and being horizontal when said bar segments are in said operating position, respective supporting wheels journaled on said axles, and extending in longitudinal alignment with the direction of travel of the cart after said tillage bar segments have been rotated to operating position, said side tillage bar segments being foldable rearwardly when the tillage bar segments are in said non-operating position, means limiting upward rotation of said side tillage bar segments relative to said intermediate tillage bar segment, said last-named means comprising a frame on said intermediate tillage bar segment, respective extensible struts connecting the opposite ends of the frame to said side tillage bar segments, and means limiting contraction of said struts, and link means connecting said axles to said intermediate said tillage bar segment and controlling the direction of said wheels so as to maintain said wheels parallel and in longitudinal alignment with the direction of travel of the cart as said side tillage bar segments are being folded rearwardly.

8. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, a fluid pressure cylinder and piston assembly operatively connected between said hitch frame and intermediate tillage bar segment to rotate said tillage bar segments between an operating position wherein said supporting arms extend substantially horizontally and rearwardly and a non-operating position wherein said supporting arms project upwardly, respective axles pivoted to said side bar tillage segments, said axles being pivoted to said side bar segments on axes parallel to the axes of the hinge connections of said side bar segments to the intermediate tillage bar segment, said axes being all substantially vertical when the tillage bar segments are in said non-operating position and being horizontal when said bar segments are in said operating position, respective supporting wheels journaled on said axles and extending in longitudinal alignment with the direction of travel of the cart after said tillage bar segments have been rotated to operating position, said side tillage bar segments being foldable rearwardly when the tillage bar segments are in said non-operating position, means limiting upward rotation of said side tillage bar segments relative to said intermediate tillage bar segment, respective control arms secured to said axles, and link means connecting said control arms to said intermediate tillage bar segment and controlling the direction of said wheels so as to maintain said wheels parallel and in longitudinal alignment with the direction of travel of the cart as said side tillage bar segments are being folded rearwardly.

9. A harrow drag cart comprising a hitch frame attachable to a towing vehicle, an intermediate transversely extending tillage bar segment journaled to said hitch frame, respective side tillage bar segments hinged to the ends of said intermediate segment, a plurality of substantially coplanar harrow supporting arms rigidly secured to said tillage bar segments, a fluid pressure cylinder and piston assembly operatively connected between said hitch frame and intermediate tillage bar segment to rotate said tillage bar segments between an operating position wherein said supporting arms extend substantially horizontally and rearwardly and a non-operating position wherein said supporting arms project upwardly, respective axles pivoted to said side bar segments, said axles being pivoted to said side bar segments on axes parallel to the axes of the hinged connections of said side bar segments to the intermediate tillage bar segment, said axes being all substantially vertical when the tillage bar segments are in said non-operating position and being horizontal when said bar segments are in said operating position, respective supporting wheels journaled on said axles and extending in longitudinal alignment with the direction of travel of said cart after said tillage bar segments have been rotated to an operating position, said side tillage bar segments being foldable rearwardly when the tillage bar segments are in said non-operating position, means limiting upward rotation of said side tillage bar segments relative to said intermediate tillage bar segment, respective control arms secured to said axles, link means connecting said control arms to said intermediate tillage bar segment and controlling the direction of said wheels so as to maintain said wheels parallel and in longitudinal alignment with the direction of travel of the cart as said side tillage bar segments are being folded rearwardly, and respective flexible cables connecting the forward portion of said hitch frame to the outer portions of said side tillage bar segments, said cables being substantially taut when said tillage bar segments are in said operating position but becoming loose when said tillage bar segments are rotated to said non-operating position.

References Cited in the file of this patent
UNITED STATES PATENTS

| | | |
|---|---|---|
| 2,944,615 | Clark | July 12, 1960 |
| 2,966,219 | French | Dec. 27, 1960 |
| 2,970,658 | Kopaska | Feb. 7, 1961 |